(12) United States Patent
Zhong

(10) Patent No.: US 11,078,959 B1
(45) Date of Patent: Aug. 3, 2021

(54) HIGH SPEED BEARING WITH SINGLE PIECE WIDE PLASTIC CAGE

(71) Applicant: Schaeffler Technologies AG & Co. KG, Herzogenaurach (DE)

(72) Inventor: Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/897,796

(22) Filed: Jun. 10, 2020

(51) Int. Cl.
*F16C 33/41* (2006.01)
*F16C 33/44* (2006.01)
*F16C 19/16* (2006.01)

(52) U.S. Cl.
CPC .............. *F16C 33/44* (2013.01); *F16C 19/16* (2013.01)

(58) Field of Classification Search
CPC ...... F16C 19/06; F16C 33/416; F16C 33/418; F16C 33/44
See application file for complete search history.

(56) References Cited

U.S. PATENT DOCUMENTS

| 5,722,780 | A | 3/1998 | Scharman | |
|---|---|---|---|---|
| 5,749,661 | A | 5/1998 | Moller | |
| 7,364,365 | B2 | 4/2008 | Begin | |
| 8,622,622 | B2* | 1/2014 | Solfrank | F16C 33/3843 384/470 |
| 2010/0142874 | A1* | 6/2010 | Doyer | F16C 33/6614 384/523 |
| 2011/0002568 | A1* | 1/2011 | Kawamura | F16C 33/6629 384/470 |
| 2018/0106295 | A1* | 4/2018 | Koda | F16C 33/416 |

FOREIGN PATENT DOCUMENTS

| DE | 102017115881 A1 | 11/2018 | |
|---|---|---|---|
| JP | 2007298164 A * | 11/2007 | F16C 33/3831 |

\* cited by examiner

*Primary Examiner* — Philip A Johnson
(74) *Attorney, Agent, or Firm* — Reid A. Baldwin

(57) ABSTRACT

A ball bearing is adapted to high-speed applications. The single-piece plastic cage has a wide flange portion. In particular, the mass of the flange portion is at least 40% of the total mass of the cage.

14 Claims, 2 Drawing Sheets

HIGH SPEED BEARING WITH SINGLE PIECE WIDE PLASTIC CAGE

TECHNICAL FIELD

The disclosure applies to the general area of roller bearings. More particularly, it applies the area of roller bearings designed for high-speed operation.

BACKGROUND

The desire to reduce fossil fuel consumption has led to the adoption of vehicle powertrains that utilize electric motors. Some of these motors operate at significantly higher speeds than typical internal combustion engines. These higher operating speeds put additional demands on bearings.

SUMMARY

A bearing cage includes an annular flange portion and a plurality of wings. The wings extend axially from the flange portion to define a plurality of roller pockets. The roller pockets may be shaped to accommodate balls. The flange portion has a flange mass greater than 40% of a total mass of the bearing cage. The wings may define mass reduction cutouts on an outer surface and/or on an inner surface. The mass reduction cutouts may not extend into the flange portion. The cage may be plastic.

A bearing includes a bearing cage as described above, inner and outer rings, and a plurality of rollers. The outer ring has a radially inward facing outer race. The inner ring has a radially outward facing inner race. Each of the rollers is retained in one of the roller pockets and is in rolling contact with the inner race and the outer race.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
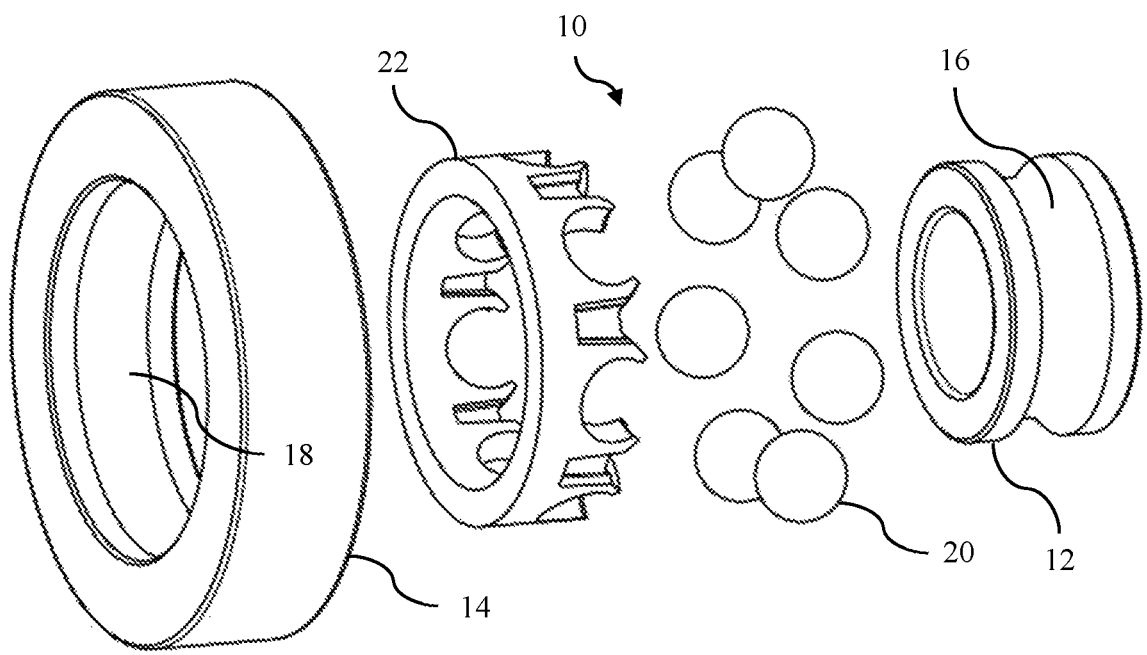
FIG. 1 is an exploded view of a high-speed bearing.

FIG. 1 illustrates components of a high-speed ball bearing. The bearing includes an inner ring 12 and an outer ring 14. At least one of the inner and outer rings is fixed to a rotatable component. The other may be fixed to either a non-rotatable structure or to another rotatable component. An outer surface of the inner ring 12 defines an inner race 16. Similarly, an inner surface of outer ring 14 defines an outer race 18. A set of ball rollers transmit radial and axial forces between the inner ring 12 and the outer ring 14. The balls are in rolling contact with the inner race 16 and the outer race 18 such that minimal torque is transferred between the inner ring 12 and the outer ring 14. A cage 22 separates the balls from one another circumferentially.

Figure 2:
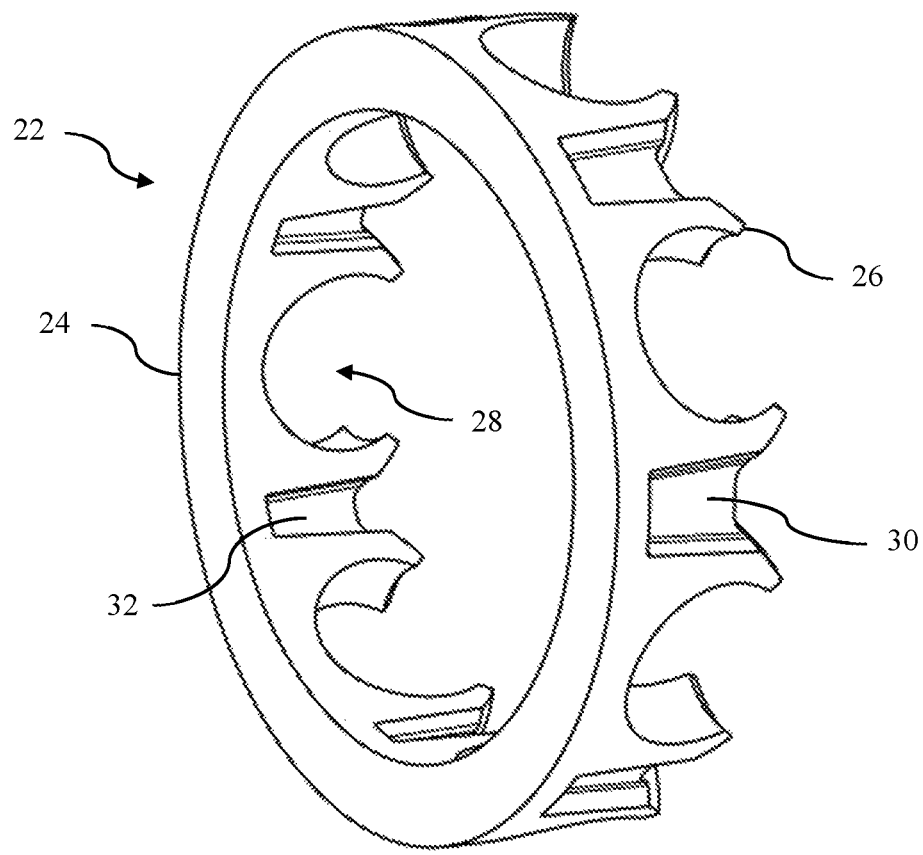
FIG. 2 is a pictorial view of the bearing cage of the bearing of FIG. 1.

FIG. 2 illustrates the bearing cage 22 in more detail. One side of the cage is a flange portion 24 which is continuous around the circumference. A set of wings 26 extend axially from the flange portion 24. These wings define a set of roller pockets 28. The walls of the roller pockets are curved to accommodate a spherical roller. A first set of mass reduction cutouts 30 is formed into an outer surface of the wings. A second set of mass reduction cutouts 32 is formed into an inner surface of the wings.

The cage 22 will tend to rotate at a speed between the speeds of the inner ring 12 and the outer ring 14. At high speeds, wings 26 will tend to deflect radially due to centrifugal forces, resulting in high stresses, especially near the surface that defines the roller pocket. Stresses in the flange, however, tend to be much lower because the flange is circumferentially continuous. In the flange portion, the radially loads due to centrifugal forces are carried by hoop stress. The conventional approach for addressing excessive stresses due to centrifugal forces is to reduce the mass of the cage. The inventor has discovered, however, that the stresses can be reduced by adding mass as long as the additional mass is in the proper location. Surprisingly, increasing the mass of the flange portion, which is not highly stressed, actually reduces the maximum stress.

Figure 3:
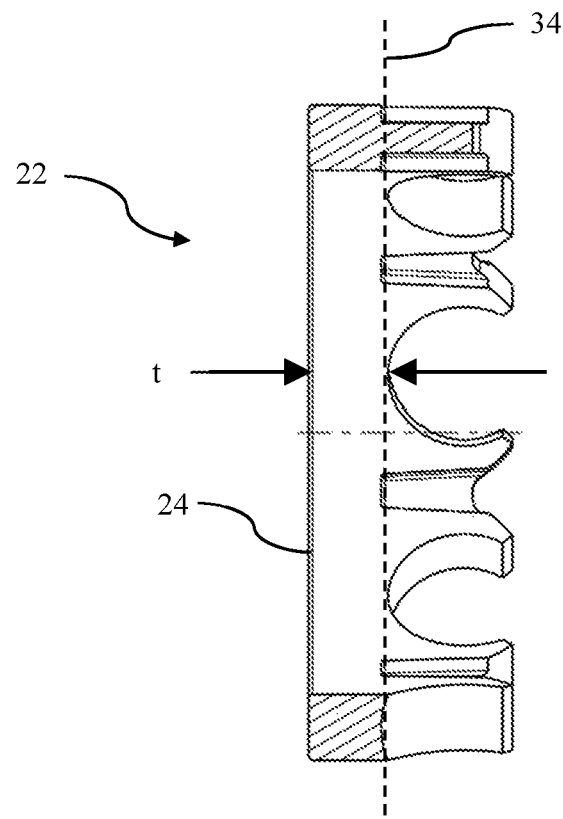
FIG. 3 is a cross-sectional view of the bearing cage of the bearing of FIG. 1.
Figure 4:
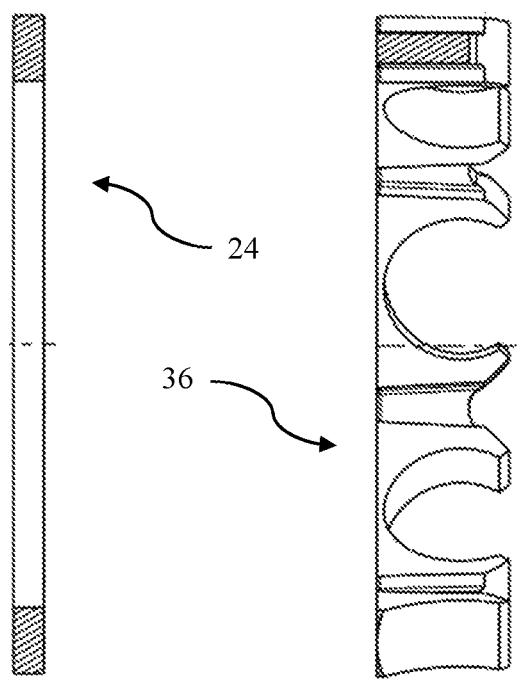
FIG. 4 is a cross-sectional view of the bearing cage of the bearing of FIG. 1 showing the flange portion and the unbalanced portion separated.

FIG. 3 is a cross-sectional view of bearing cage 22. Dotted line 34 indicates a plane that separates the flange portion 24 from the remainder of the cage 36 which is referred to as the unbalanced portion. FIG. 4 shows these two portions physically separated, although they may be fabricated as a single piece. The plane separating these two portions is defined to pass through the point of each roller pocket closest to flange end of the cage. The flange portion has a thickness t. The flange portion has a mass $M_{bal}$. The unbalanced portion has a mass $M_{unbal}$. These two masses add up to a total cage mass $M_t$. The inventor has found that the stresses are reduced to acceptable levels when $M_{bal}$ is at least 40% of $M_t$. In other words, the stresses are acceptable is $M_{unbal}$ is less than or equal to 60% of $M_t$.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing cage comprising:
    an annular flange portion having a flange mass; and
    a plurality of wings extending axially from the flange portion to define a plurality of roller pockets; wherein the flange mass is greater than 40% of a total mass of the bearing cage.
2. The bearing cage of claim 1 wherein the roller pockets are shaped to accommodate balls.
3. The bearing cage of claim 1 wherein the wings define mass reduction cutouts.
4. The bearing cage of claim 3 wherein the mass reduction cutouts are indentations from an outer surface.
5. The bearing cage of claim 3 wherein the mass reduction cutouts are indentations from an inner surface.
6. The bearing of claim 3 wherein the mass reduction cutouts do not extend into the flange portion.
7. The bearing cage of claim 1 wherein the cage is plastic.
8. A bearing comprising:
    a bearing cage having an annular flange portion and a plurality of wings extending axially from the flange portion to define a plurality of roller pockets wherein a mass of the flange portion exceeds 40% of a total mass of the bearing cage;
    an outer ring having a radially inward facing outer race;
    an inner ring having a radially outward facing inner race; and
    a plurality of rollers each retained in one of the roller pockets and in rolling contact with the inner race and the outer race.
9. The bearing of claim 8 wherein the rollers are balls.
10. The bearing of claim 8 wherein the wings of the bearing cage define mass reduction cutouts.
11. The bearing of claim 10 wherein the mass reduction cutouts are indentations from an outer surface.
12. The bearing of claim 10 wherein the mass reduction cutouts are indentations from an inner surface.
13. The bearing of claim 10 wherein the mass reduction cutouts do not extend into the flange portion.
14. The bearing of claim 8 wherein the cage is plastic.

* * * * *